W. J. JAMISON.
BAIT.
APPLICATION FILED SEPT. 2, 1914.
1,232,804.
Patented July 10, 1917.
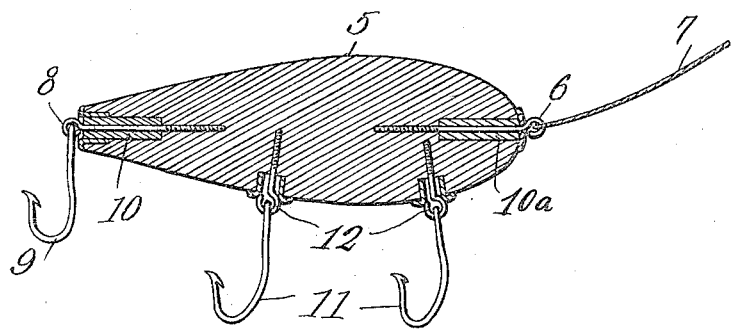
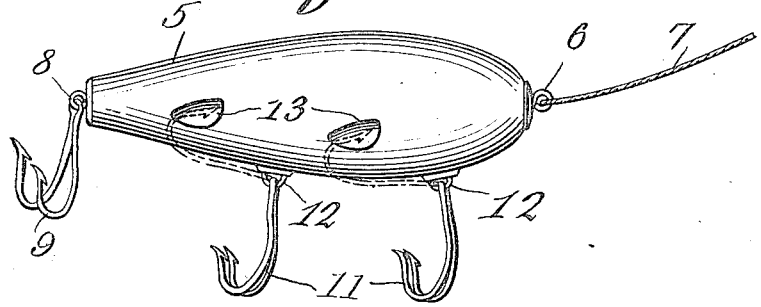
William J. Jamison.
Inventor

UNITED STATES PATENT OFFICE.

WILLIAM J. JAMISON, OF CHICAGO, ILLINOIS.

BAIT.

1,232,804.

Specification of Letters Patent.

Patented July 10, 1917.

Application filed September 2, 1914. Serial No. 859,804.

*To all whom it may concern:*

Be it known that I, WILLIAM J. JAMISON, a citizen of the United States, residing at Chicago, in the county of Cook and State of Illinois, have invented certain new and useful Improvements in Baits, of which the following is a specification.

This invention relates to artificial bait or fish lures for casting or trolling, and its object is to provide a simple and highly efficient device of this kind.

A further object of the invention is to provide an effective bait of the kind stated which may be used freely among lilies, rushes, grasses, and other aquatic vegetation, and also among stumps, snags, logs, etc., with but little danger of fouling or snagging, *i. e.*, the hooks catching on such obstructions.

In order that the invention may be fully understood, reference is had to the accompanying drawing, in which—

Figure 1 is a longitudinal section of the bait, and

Fig. 2 is an elevation thereof.

Referring specifically to the drawing, the body 5 of the bait is substantially conical in shape, and it is made of some material which will float. One end of the bait body is rounded and larger than the other end, the larger end, which is the forward end, being fitted with an eye 6 for the line 7. The eye 6 may be an ordinary screw-eye, as shown. To the smaller or rear end of the bait body is also applied a screw-eye 8 for attachment of a hook 9. Each end of the bait body has a central opening in which seats a weight. The weight at one end is indicated at 10, and the weight at the other end at 10ª. The screw-eyes extend longitudinally through these weights and may be applied thereto before the latter are seated in the bore of the bait body. The weights serve to balance the bait body and to maintain it in horizontal position in the water, and also to make the ends of the bait heavier than the center, which, together with the resistance of the bait, causes it to have an eccentric motion when being drawn through the water. This motion is commonly known as "wabbling" and consists of describing a portion of a circle or an arc first in one direction and then in the other, this motion continuing as long as the bait is in motion, and the same may be exaggerated or decreased by increasing or decreasing the size of the weights and by increasing or decreasing the speed of the bait.

By the manipulation of these weights the bait may be made to run at different levels under water and also to run partly exposed at the surface. This last is attained by removing the weight and hook from the smaller end of the bait and attaching the line thereto. The bait may be made to run deeper in the water by removing both weights and by attaching the line to either end, and it may be made to run still deeper by removing the weight from the opposite end to which the line is attached. When running at the lower levels the bait loses considerable of its "wabbling" motion, and when running at the top or surface of the water it has a "wiggling" motion, creating more or less disturbances of the water. All these different motions are attractive to fish as they simulate life.

The bottom portion of the bait body carries hooks 11. These hooks are made double and so shaped and attached to the bait and spread that they will lie snugly up against the under side of the latter and straddle the same with the points very close to or touching the body thereof when pressed upward by contact with weeds or other obstructions, the hooks being loosely connected to the bait body by screw-eyes 12. When the hooks are thus pressed upward against the body of the bait, the forward end of which, being larger and rounded, has a tendency to deflect weeds, etc. The hooks are so constructed and attached to the bait that the shank of the hooks extends considerably forward and is below the point of the hooks, and thus it will readily be seen that the weeds or obstructions will strike the shank first, and the hooks, hanging loose, will rise upward until pressed against the under side of the bait body and be protected by the same. To further assure protection to the points of the hooks, depressions 13 may be made in the body of the bait in such a manner that the point of the hooks will lie therein when moved up against the body of the bait.

In use, when the bait body is drawn through the water, its rounded and enlarged forward end, together with the weight at this end and at the other end, will give it an eccentric or "wabbling" motion similar or somewhat similar to that of a wounded fish, in view of which it is highly effective in attracting fish. The hooks 11 will not collect weeds nor foul when striking snags, stumps, etc., as they nestle closely to the side of the body when striking the same and they hang down when the same have been passed. If the line 7 is attached to the smaller end of the bait body and the weight 10 is removed, the device will travel in an inclined position, the nose sticking out above the surface of the water.

I claim:

1. An artificial fish bait comprising a buoyant body having line-attaching means, and double hooks attached to the under side of the body, the bends of the hooks being spread apart a distance to straddle the bait body when swung upward thereagainst, said body having depressions in which the points of the hooks lie when they straddle the body.

2. An artificial fish bait comprising a buoyant body, one end of which is rounded and larger than at the other end, line attaching means for the body, and pendant double hooks attached loosely to the under side of the body, the bends of the hooks being spread apart a sufficient distance to straddle the bait body when swung upward thereagainst, the points of the hooks being then in contact with the body, and said hooks being located to straddle the bait body to the rear of its larger end.

In testimony whereof I affix my signature in presence of two witnesses.

WILLIAM J. JAMISON.

Witnesses:
S. J. LEHRER,
H. G. BATCHELOR.

Copies of this patent may be obtained for five cents each, by addressing the "Commissioner of Patents, Washington, D. C."